Dec. 23, 1952
D. CATLEY
2,622,650
RESILIENT WHEEL
Filed Nov. 10, 1949
2 SHEETS—SHEET 1
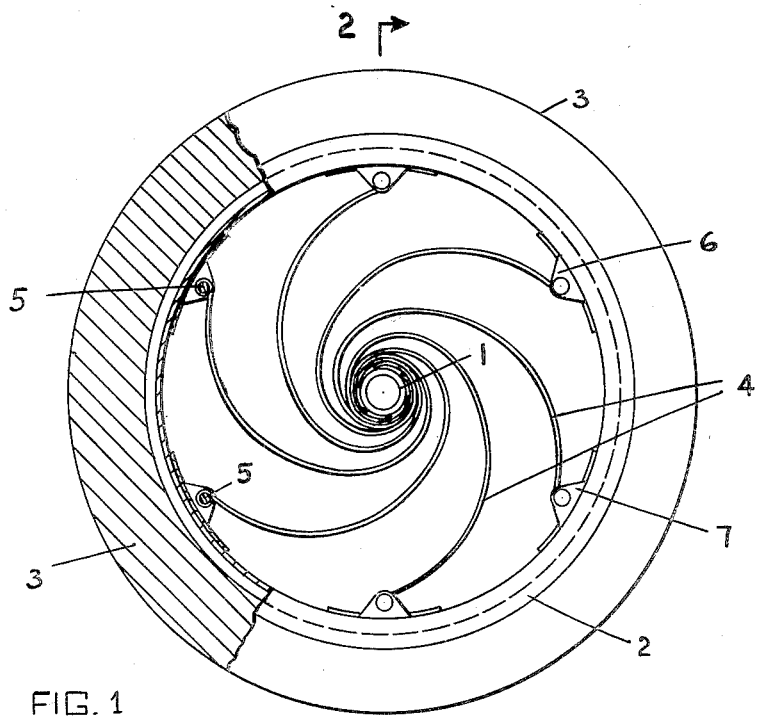
FIG. 1
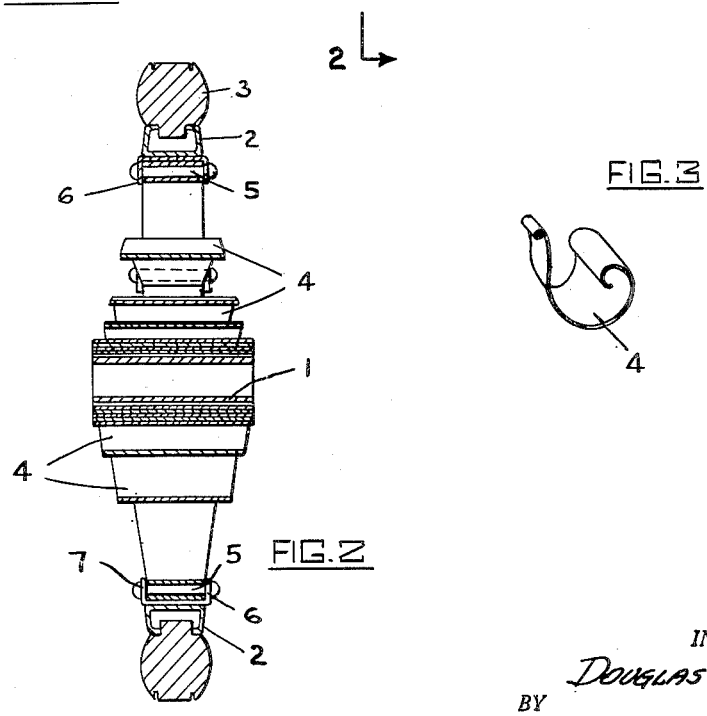
FIG. 2
FIG. 3
INVENTOR.
DOUGLAS CATLEY
BY
Young, Emery & Thompson
Att'ys.

Dec. 23, 1952  D. CATLEY  2,622,650
RESILIENT WHEEL
Filed Nov. 10, 1949  2 SHEETS—SHEET 2

INVENTOR.
Douglas Catley
BY
Young, Emery & Thompson
Attys.

Patented Dec. 23, 1952

2,622,650

UNITED STATES PATENT OFFICE 2,622,650

RESILIENT WHEEL

Douglas Catley, Northland, Wellington, New Zealand, assignor to Catley Resilient Wheel (Overseas) Limited, Auckland, New Zealand, a corporation of New Zealand Application November 10, 1949, Serial No. 126,527
In New Zealand November 19, 1948

3 Claims. (Cl. 152—96)

1

This invention relates to resilient wheels of the type employing an inner member, an outer member, and resilient connecting spring spokes between the inner and outer members, and wherein the spring spokes are arranged spirally and all in the same general direction about the axis of the wheel.

Some forms of resilient wheel of the above type have been proposed, but those with which I am acquainted are open to one or more of the following objections:

(a) Extraneous fastening means are required to secure the inner ends of the spokes to the inner member, which renders the construction unduly complicated and unduly increases the cost.

(b) The method of attachment of the spokes is not usually suitable for any great degree of diametral flexing under load which in many cases must result in weakening and breakage of the spokes.

(c) The spokes could not withstand any considerable driving or braking torque, which, if applied in any substantial degree would result in excessive bending and possibly breakage of the spokes.

The present invention has been principally devised in an endeavour to provide improvements in resilient wheels of the above type whereby an ample degree of resilience is obtained, and wherein the risk of breakage of the spokes is obviated.

The invention consists in a resilient wheel of the type described, wherein the spring spokes are so curved at their inner ends and are so associated with one another and with the inner member which is forced into position that they are securely interlocked together and wrapped around the said inner member in such a way as to securely and tightly hold the inner member without requiring extraneous holding means.

An important feature of the invention in one embodiment is the special construction employed to enable the wheel to withstand substantial torque in one or both directions, as will be hereinafter described.

The invention will now however be described with reference to the accompanying drawings in which—

Figure 5:
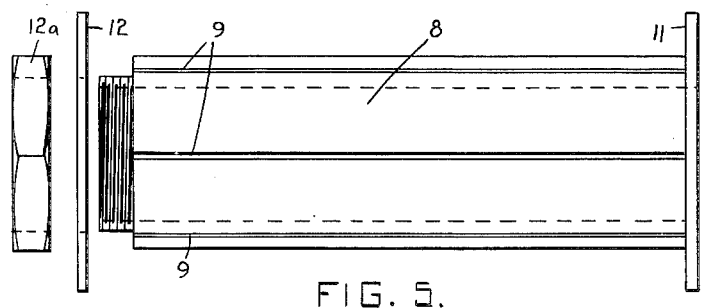
Figures 4, 6, 7:
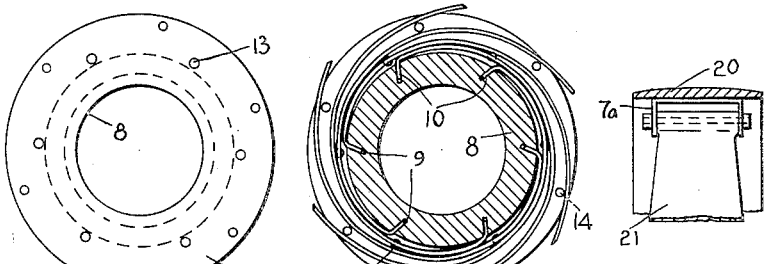
Figure 8:
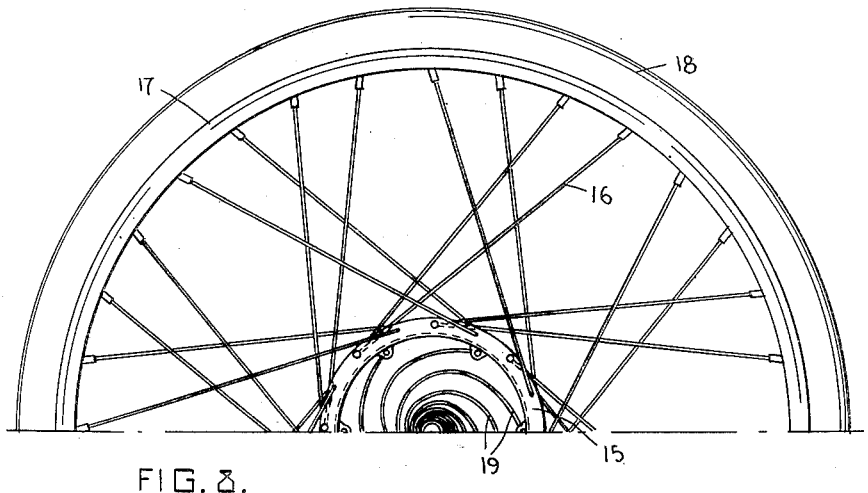

Figure 1 is a side elevation of one form of wheel according to the invention, a part of the rim and tyre being shown in section, Figure 2 is a section therethrough on the line 2—2, Figure 1, Figure 3 is a pictorial view of one of the spring spokes thereof, Figure 4 is a cross-sectional view through the middle portion of another form of wheel according to the invention, Figure 5 is a front elevation of the hub employed in the construction shown in Figure 4,

2 the nut and collar being shown removed from the end of the hub,

Figure 6 is an end elevation of the inner member of the wheel shown in Figures 4 and 5, Figure 7 is a part sectional view through the outer member of a pulley wheel constructed according to the present invention, showing an associated bracket, pivot pin and spoke, and Figure 8 is a part side elevation of an alternative form of the invention as applied to the type of wheel employed in bicycles and for other similar purposes.

In the construction shown in Figures 1 to 3 of the drawings, an inner member or hub 1 and an outer member 2 are provided, the latter constituting the rim of the wheel which is a ground wheel, a rubber or the like tyre 3 being provided on the said rim.

A plurality of spiral spring spokes 4 are arranged equidistantly around the wheel and are wound in the same general direction relatively to the axis of the wheel, the inner ends of the spokes being so curved at their inner ends and so associated with the inner member or hub 1 that the latter requires to be forced or pressed axially into position and the inner ends of the spokes are securely interlocked together and wrapped around the inner member or hub in such a way as to tightly and securely hold the inner member or hub without requiring extraneous holding means.

The outer ends of the spokes encircle pivot pins 5 substantially parallel with the axis of the wheel, said pins being carried between appropriate lugs 6 on brackets 7 welded to an projecting inwards from the outer member 2.

The spring spokes 4 are tapered outwardly from their broad inner ends and are made of flat section spring-steel or the like. By way of example, but not by way of limitation, each spoke may extend spirally through an angle of about 450° in relation to the wheel.

The number of convolutions of each spoke is determined according to a number of factors. A greater number of convolutions increases the resilience or "softness" of the wheel, but reduces lateral stability. Shortening of the spokes beyond a predetermined limit brings them inside the permissable limit of elasticity of the metal from which they are formed. The selection of spoke length thus lies between a safe minimum determined according to the elastic limit and a practical extreme determined according to the desired lateral stability.

The form of the invention shown in Figures 1 to 3 is applicable to such uses as to the wheels of scooters, prams and suchlike, the inner member 1 being a hub running on a suitable fixed axle. In such uses, the wheel is not a driving wheel and is not braked from the centre. It will of course be obvious that the same inner construction could be used in the case of wheels where the spokes are subject to a driving or braking load provided that the direction of the load is such as to tend to "wind up" the spokes and provided that the load is not too great. Where the load is very low, the inner construction shown in Figures 1 to 3 can also be used where the load is in the opposite direction, or where at different times it is in both directions.

The construction shown in Figures 4 to 6 has been devised primarily to enable appreciable loads to be transmitted in either or both directions, for example in the case of motor trailer wheels.

In the latter construction, an inner member or hub 8 is provided, with a number of slots or grooves 9 extending across it parallel to its axis, and in said slots engage the inwardly turned broad ends 10 of the spokes which extend outwards to a suitable outer member.

In the construction shown in Figs. 4 to 6, the gripping effect at the inner ends of the spokes is substantially the same as in Figs. 1 to 3, and the slots or grooves 9 are only for the purpose of transmitting extreme torque, and are not for the purpose of securing the spokes to the inner member.

The hub has an annular fixed end flange 11 at one end, while at its opposite end it has a collar 12 which is slidably removable and is lockable in place by a nut member 12a screwed onto the end of the hub member. The flange 11 has a series of access holes 13 arranged so that a tool can be applied through the access holes to drive or force the inner end of any desired spoke from its groove if and when replacement is necessary.

The grooves 9 can extend into the hub member substantially radially or at a tangent to a circle smaller than the outside of the hub, the latter arrangement being shown in the drawings.

Near the inner ends of the spokes, limit or retaining pins or bolts 14 or the like pass through the flange 11 and the collar 12, said pins or bolts or the like being substantially parallel to the axis of the inner member or hub and being adapted to limit backward flexing of the spokes in the event of reversal of the drive or when braking, which might result in damage to the assembly and possible displacement or breakage of the inwardly turned ends of the spokes.

This construction, can, with appropriate modifications, be applied to a wheel of a motor vehicle.

The form of the invention shown in Figures 4 to 6 may be employed, without the limit pins, where an appreciable torque is being applied in the direction which tends to "wind up" the spokes.

The outer member may be the outer-most member of the wheel, or it may be surrounded by another member or members. For example in the embodiment of the invention shown in Figures 1 to 3 said outer member is the rim of a ground wheel such as a pram or the like wheel and is surrounded by a rubber or the like tyre, while in the embodiment of the invention shown in Figure 8, the wheel is a ground wheel and the outer member 15 is a ring member intermediate between the axis of said wheel and the rim thereof, with conventional bicycle type spokes 16 radiating from the member 15 to the outer rim 17 and rubber or the like tyre 18 of conventional pattern. Where the invention is applied to a cycle wheel in this manner, the resilient spokes 19 may in such a case taper outwards from a width of about three inches at the hub.

I anticipate that in the application of my invention to the suspension of motor vehicles and suchlike, increased wheel resilience will be obtained and/or the conventional springing system may be dispensed with so that the invention would have a similar effect to known independent suspension systems, with many of the advantages thereof—e. g. improved riding and less unsprung weight—while a much less complicated chassis construction would be possible. Furthermore, the drive transmission to the wheels, where such wheels are the driving wheels of the vehicle, would be cushioned. I believe also that by use of the invention there should be a reduction in the possibilities of skidding of a vehicle.

A further use of the invention, as shown in Figure 7, is in the construction of belt pulleys, where the brackets 7a are attached to an outer member comprising a pulley rim 20 and the resilience of the spokes 21 provides a desired belt tension.

The operation of the invention will be clear from the preceding description.

It will be obvious that where the invention is applied to a wheel transmitting a drive the wheel may be driven from the centre or the outside provided that the direction of rotation is suited to the design of the wheel.

It will be obvious that the curvature of the innermost part of each spoke would be varied to suit the diameter of the inner member to insure the correct degree of grip.

I claim:

1. A resilient wheel comprising a central hub, an outer member, and a plurality of spiral leaf spring spokes connecting the hub and the outer member, the leaf springs overlapping each other around the hub, whereby in each of a plurality of radial sections always at least two adjacent springs press against each other adjacent the hub and the inner most spring presses against the hub, the leaf springs having such an initial stress between the hub and the outer member that the hub is held only by the pressure of the leaf springs against the hub.

2. A resilient wheel according to claim 1, wherein means are provided associated with the outer member of the wheel, the outer ends of the spokes being pivotally connected to said means.

3. A resilient wheel according to claim 1, wherein the wheel is a ground wheel and the outer member is a rim carrying a rubber tire.

DOUGLAS CATLEY.

REFERENCES CITED

The following references are of record in the file of this patent:

UNITED STATES PATENTS

| Number | Name | Date |
|---|---|---|
| 981,515 | Anderson | Jan. 10, 1911 |
| 1,158,373 | Cave | Oct. 26, 1915 |
| 1,178,502 | Dunbar | Apr. 11, 1916 |
| 1,228,744 | Breen | June 5, 1917 |
| 1,411,665 | Kirchner | Apr. 4, 1922 |
| 1,441,969 | Devore | Jan. 9, 1923 |

FOREIGN PATENTS

| Number | Country | Date |
|---|---|---|
| 702,808 | Germany | Feb. 17, 1941 |